(12) United States Patent
Pressler

(10) Patent No.: US 12,001,189 B2
(45) Date of Patent: Jun. 4, 2024

(54) SYSTEMS AND METHODS FOR IMPROVED MANUFACTURING DIAGNOSTICS

(71) Applicant: STEERING SOLUTIONS IP HOLDING CORPORATION, Saginaw, MI (US)

(72) Inventor: John F. Pressler, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 233 days.

(21) Appl. No.: 17/021,534

(22) Filed: Sep. 15, 2020

(65) Prior Publication Data

US 2022/0083020 A1 Mar. 17, 2022

(51) Int. Cl.
*G05B 19/406* (2006.01)
*G01M 17/00* (2006.01)

(52) U.S. Cl.
CPC .......... *G05B 19/406* (2013.01); *G01M 17/00* (2013.01); *G05B 2219/32368* (2013.01)

(58) Field of Classification Search
None
See application file for complete search history.

(56) References Cited

U.S. PATENT DOCUMENTS

| | | | |
|---|---|---|---|
| 6,456,914 B1* | 9/2002 | Fratini | B62D 15/02 701/41 |
| 2002/0133278 A1* | 9/2002 | Leaphart | B62D 15/02 180/443 |
| 2008/0177437 A1* | 7/2008 | Asgari | B60W 50/045 701/33.9 |
| 2013/0110351 A1* | 5/2013 | Stone | B62D 11/24 701/33.1 |
| 2017/0190355 A1* | 7/2017 | Ghoneim | B62D 15/021 |

* cited by examiner

*Primary Examiner* — Matthew G Marini
(74) *Attorney, Agent, or Firm* — Dickinson Wright PLLC

(57) ABSTRACT

A method for identifying potential component manufacturing issues identifying a first set of calibration values corresponding to a first component and flashing a controller associated with the first component with the first set of calibration values. The method also includes performing at least one diagnostic test on the first component and, in response to receiving at least one diagnostic flag resulting from the at least one diagnostic test, determining whether the at least one diagnostic flag includes a false positive response. The method also includes, in response to a determination that the at least one diagnostic flag includes a false positive response, selectively adjusting at least one calibration value of the first set of calibration values and, in response to a determination that the at least one diagnostic flag does not include a false positive response, flashing the controller associated with the first component with a first set of production calibration values.

13 Claims, 4 Drawing Sheets

SYSTEMS AND METHODS FOR IMPROVED MANUFACTURING DIAGNOSTICS

TECHNICAL FIELD

This disclosure relates to manufacturing diagnostics and in particular to systems and methods for improved manufacturing diagnostics.

BACKGROUND

A vehicle, such as a car, truck, sport utility vehicle, crossover, mini-van, marine craft, aircraft, all-terrain vehicle, recreational vehicle, or other suitable forms of transportation, typically includes various controllers, such as electronic control units or other suitable controllers, configured to control various components of corresponding systems. For example, a vehicle typically includes a steering system, such as a steer by wire steering system, an electronic power steering system, and the like. Such steering systems typically include one or more controllers configured to control various components of the steering system.

During engineering and manufacturing phases of development of such components, various functional tests may be run in a testing or pre-manufacturing environment on the various components to identify potential first time quality or early use issues. Such issues may be remedied prior to corresponding components entering the commercial environment. Alternatively, such components may be scrapped to avoid being placed in the commercial environment.

SUMMARY

This disclosure relates generally to diagnostic testing systems and methods.

An aspect of the disclosed embodiments includes a method for identifying potential component manufacturing issues. The method includes identifying, for a first component, a first set of calibration values corresponding to the first component and flashing a controller associated with the first component with the first set of calibration values. The method also includes performing at least one functional test on the first component and, in response to receiving at least one diagnostic flag resulting from the at least one diagnostic test, determining whether the at least one diagnostic flag includes a false positive response. The method also includes, in response to a determination that the at least one diagnostic flag includes a false positive response, selectively adjusting at least one calibration value of the first set of calibration values. The method also includes, in response to a determination that the at least one diagnostic flag does not include a false positive response, flashing the controller associated with the first component with a first set of production calibration values.

Another aspect of the disclosed embodiments includes a system for identifying potential component manufacturing issues. The system includes a processor and a memory. The memory includes instructions that, when executed by the processor, cause the processor to: identify, for a first component, a first set of calibration values corresponding to the first component; flash a controller associated with the first component with the first set of calibration values; perform at least one functional test on the first component; in response to receiving at least one diagnostic flag resulting from the at least one diagnostic test, determine whether the at least one diagnostic flag includes a false positive response; in response to a determination that the at least one diagnostic flag includes a false positive response, selectively adjust at least one calibration value of the first set of calibration values; and, in response to a determination that the at least one diagnostic flag does not include a false positive response, flash the controller associated with the first component with a first set of production calibration values.

Another aspect of the disclosed embodiments includes an apparatus for identifying potential component manufacturing issues. The apparatus includes a processor and a memory. The memory includes instructions that, when executed by the processor, cause the processor to: identify, for a first component, a first set of calibration values corresponding to the first component; flash a controller associated with the first component with the first set of calibration values; perform at least one diagnostic test on the first component; in response to receiving at least one diagnostic flag resulting from the at least one diagnostic test, determine whether the at least one diagnostic flag includes a false positive response; in response to a determination that the at least one diagnostic flag includes a false positive response, selectively decrease a diagnostic sensitivity of at least one calibration value of the first set of calibration values; in response to a determination that the at least one diagnostic flag does not include a false positive response, flash the controller associated with the first component with a first set of production calibration values; and, in response to a determination that the result of the at least one diagnostic test includes no diagnostic flags, selectively increase the diagnostic sensitivity of at least one calibration value of the first set of calibration values.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 generally illustrates a vehicle according to the principles of the present disclosure.

FIG. 2 generally illustrates a computing device according to the principles of the present disclosure.

FIG. 3 generally illustrates a controller according to the principles of the present disclosure.

FIG. 4 is a flow diagram generally illustrating an issue identification method according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
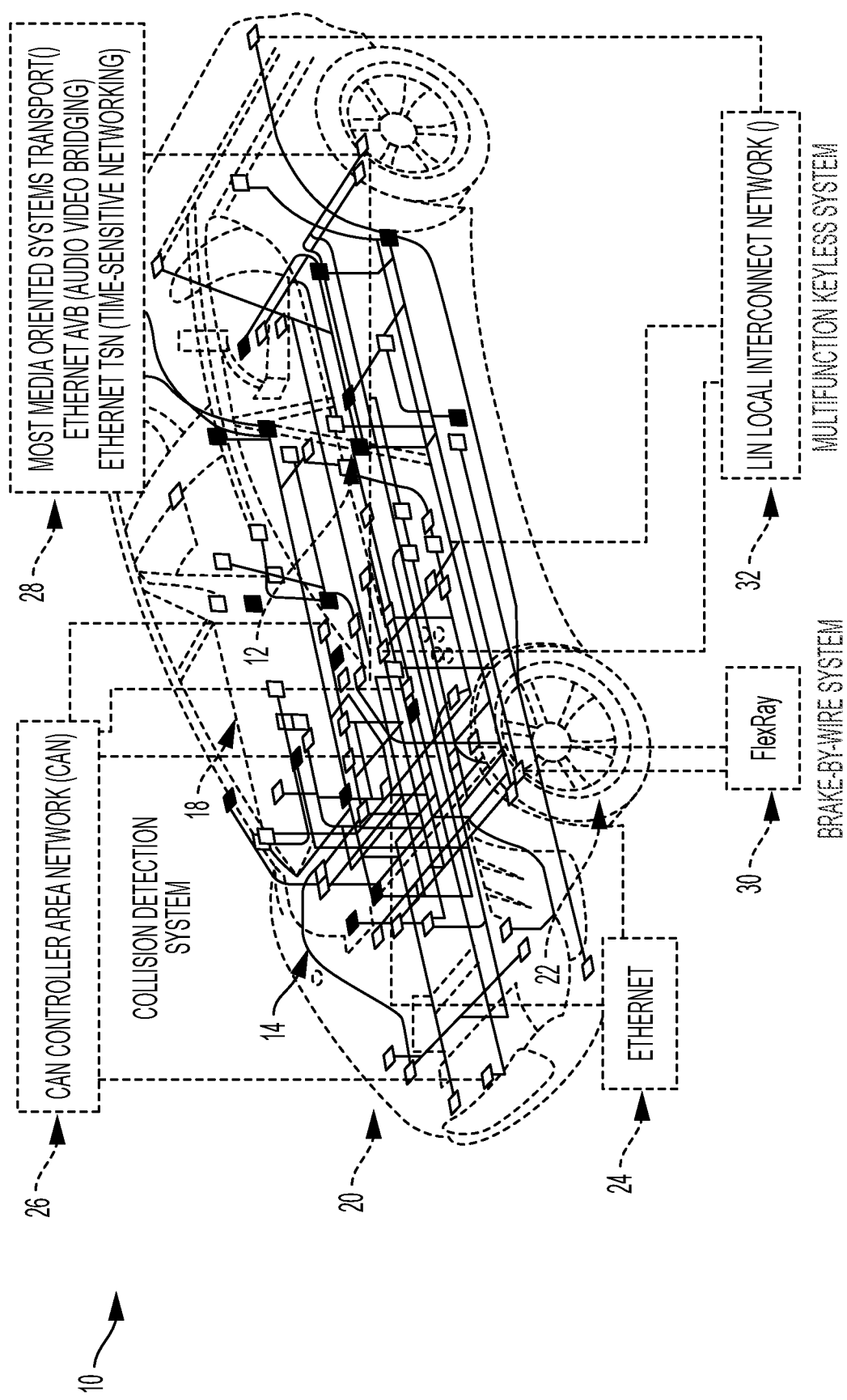

As described, a vehicle, such as a car, truck, sport utility vehicle, crossover, mini-van, marine craft, aircraft, all-terrain vehicle, recreational vehicle, or other suitable vehicles, typically includes various controllers, such as electronic control units or other suitable controllers, configured to control various components of corresponding systems. For example, a vehicle typically includes a steering system, such as a steer by wire steering system, an electronic power steering system, and the like. Such steering systems typically include one or more controllers configured to control various components of the steering system.

During engineering and manufacturing phases of development of such components, various diagnostic tests may be run in a testing, pre-production or production environment on the various components to identify potential first time quality or early use issues. Such issues may be remedied prior to corresponding components entering a commercial environment. Alternatively, such components may be scrapped to avoid being placed in the commercial environment.

Typically, such diagnostic tests use one or more calibration values applied or flashed to the controller associated with a corresponding component being tested. The one or more calibration values may include temperature values, handwheel torque values, and the like (e.g., depending on the component being tested). For example, a calibration values for a steering component may include a handwheel torque range including an upper limit and a lower limit. The calibration values may indicate acceptable operating conditions for the corresponding components.

Typically, such calibration values closely resemble calibration values used when the corresponding component is in commercial use. However, one or more latent or potential issues in a component being tested may not be captured during performance of a diagnostic test using typical calibration values.

Accordingly, systems and methods, such as those described herein, configured to provide improved manufacturing diagnostics, may be desirable. In some embodiments, the systems and methods described herein may be configured to provide process changes and/or additional testing that may improve the identification of latent and/or patent issues prior to corresponding components entering the commercial environment. The systems and methods described herein may be configured to provide a holistic approach to manufacturing diagnostics, while not affecting cycle time or increasing stress to the components (e.g., which may potentially damage a component).

In some embodiments, the systems and methods described herein may be configured to reduce customer first time quality and/or early or perhaps even more latent field issues. The systems and methods described herein may be configured to provide modified diagnostic calibration values to increase the sensitivity of the on-board diagnostics of controllers associated with various components. The systems and methods described herein may be configured to reduce or eliminate filter values, which may reduce or eliminate "P-step" counts in order to identify components that are in a valid but partially degraded state.

The systems and methods described herein may be configured to use the modified calibration values in one or more of an engineering environment, a manufacturing environment, a testing environment, and the like. The systems and methods described herein may be configured to use the modified calibration values at the controller and/or system level of corresponding components. The systems and methods described herein may be configured to, in response to successful diagnostic testing of a component, flash a set of calibration values to the controller of the component corresponding to calibration values useable in the commercial environment (e.g., and proper labeling may proceed accordingly).

In some embodiments, the systems and methods described herein may be configured to use, during performance of the diagnostic tests, calibration values that are modified to be more sensitive to potential issues than corresponding calibration values used in the commercial environment. The systems and methods described herein may be configured to flash the modified calibration values to the controllers corresponding to the components being tested (e.g., using an Electronics Manufacturing Services (EMS)). The systems and methods described herein may be configured to flash the controllers corresponding to the components being tested with the calibration variables used in the commercial environment after successful completion of the diagnostic testing.

In some embodiments, the systems and methods described herein may be configured to identify calibration valuations that correspond to common issues. For example, the systems and methods described herein may be configured to access a database configured to store calibration values for corresponding components. The database may include any suitable database. The data stored in the database may indicate the calibration values to be used for a respective component. The systems and methods described herein may be configured to modify (e.g. increase or decrease) one or more of the calibration values for a respective component, such that the calibration values are more sensitive to potential issues.

The systems and methods described herein may be configured to modify or adjust the one or more calibration values by any suitable amount (e.g., such as 5%, 10%, and the like and/or 1 unit of measurement, 2 units of measurement, and the like). For example, some calibration value limits may be adjusted to account for the relatively more controlled or "non-extreme" conditions during manufacturing. The calibration value changes may include an upper limit of a temperature calibration value (e.g., decreased), a lower limit of the temperature calibration value (e.g., increased), a gate drive calibration value (e.g., decreased), a handwheel torque calibration value (e.g., decreased), other suitable calibration values, or a combination thereof.

In some embodiments, the systems and methods described herein may be configured to iteratively adjust the one or more calibration values for a component in order to reduce unnecessary first time quality and/or scrap during diagnostic testing, while remaining sensitive enough to capture borderline components (e.g., components that include potential issues).

In some embodiments, the systems and methods described herein may be configured to identify, for a first component, a first set of calibration values corresponding to the first component. The first component may include a component associated with a vehicle, such as a component associated with an electronic power steering system, or other suitable component. It should be understood that, while the component is described as a vehicle component, the systems and methods described herein may be configured to use any suitable component other than those described herein.

The systems and methods described herein may be configured to flash a controller or component associated with the first component with the first set of calibration values. The systems and methods described herein may be configured to perform at least one diagnostic test on the first component. The systems and methods described herein may be configured to, in response to receiving at least one diagnostic flag resulting from the at least one diagnostic test, determine whether the at least one diagnostic flag includes a false positive response.

The systems and methods described herein may be configured to, in response to a determination that the at least one diagnostic flag includes a false positive response, selectively adjust at least one calibration value of the first set of calibration values. The systems and methods described herein may be configured to, in response to a determination that the at least one diagnostic flag does not include a false positive response, flash the controller associated with the first component with a first set of production calibration values. A diagnostic sensitivity of the first set of calibration values may be greater than the diagnostic sensitivity of the first set of production calibration values.

In some embodiments, the systems and methods described herein may be configured to, in response to selectively adjusting the at least one calibration value of the first set of calibration values, perform the at least one diagnostic test on the first component using the adjusted first set of calibration values. In some embodiments, the systems and methods described herein may be configured to selectively adjust, in response to the determination that the at least one diagnostic flag includes a false positive response, the at least one calibration value of the first set of calibration values by decreasing a diagnostic sensitivity of the at least one calibration value.

In some embodiments, the systems and methods described herein may be configured to, in response to a determination that the result of the at least one diagnostic test includes no diagnostic flag, selectively adjust at least one calibration value of the first set of calibration values. In some embodiments, the systems and methods described herein may be configured to selectively adjust the at last one calibration value of the first set of calibration values, in response to the determination that the result of the at least one diagnostic test includes no diagnostic flags, by increasing a diagnostic sensitivity of the at least one calibration value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the systems and methods described herein may be configure perform improved manufacturing diagnostics on one or more components of the vehicle 10 (e.g., prior to the components of the vehicle 10 entering the commercial environment). It should be understood that the systems and methods described herein may be configured to perform the improved manufacturing diagnostics on the components of the vehicle 10 prior to the components being installed in the vehicle 10, after being installed in the vehicle 10, or both. Additionally, or alternatively, while the systems and methods according to the principles of the present disclosure are described herein as pertaining to a vehicle, it should be understood that the systems and methods and any other principles of the present disclosure may be applied to any suitable diagnostic or functional testing of any suitable component and/or controller, including, but not limited to, components and/or controllers capable of performing self-diagnostics.

Figure 2:
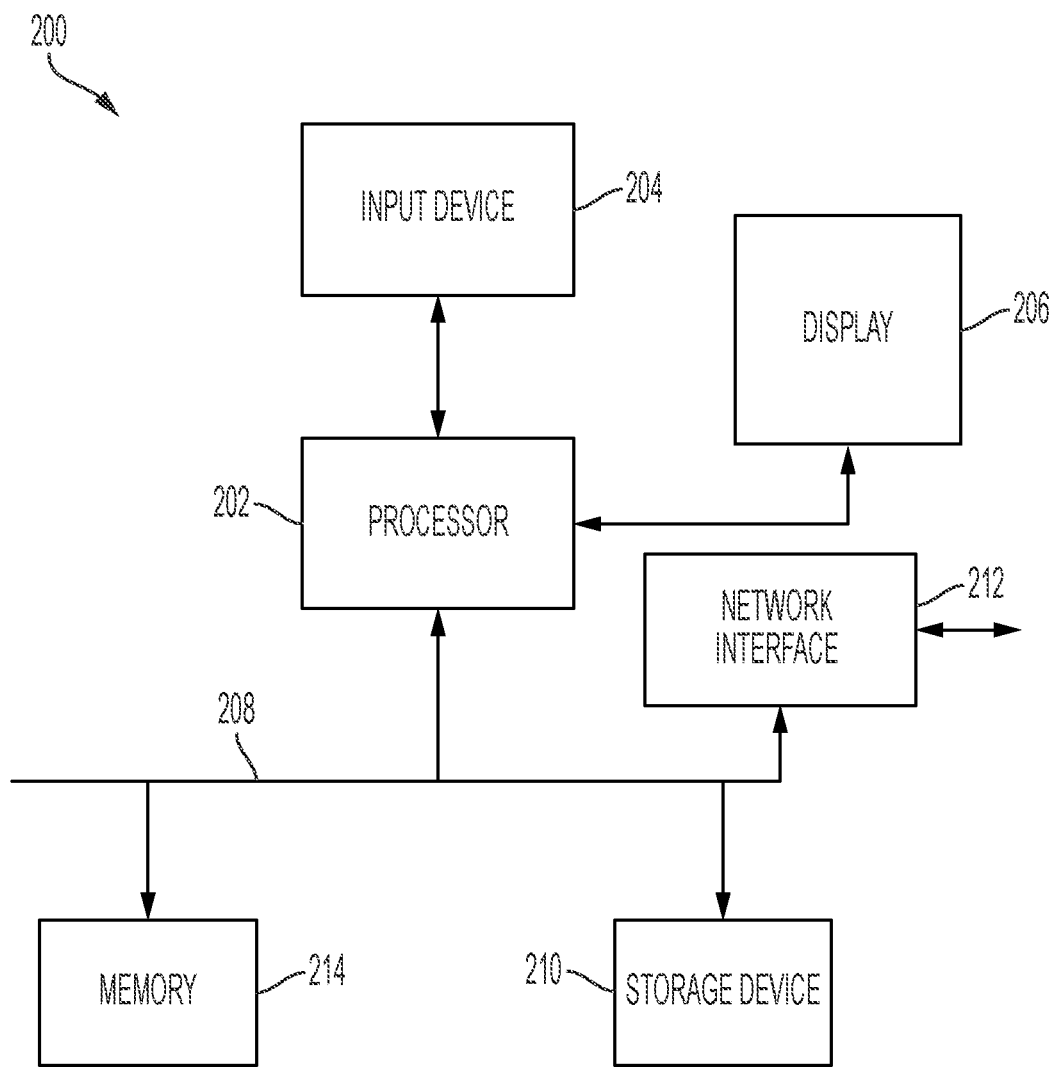

In some embodiments, the systems and methods described herein may be configured to be performed on a computing device, such as the computing device 200 as is generally illustrated in FIG. 2. The computing device 200 may include any suitable computing device. The computing device 200 may include a processor 202 configured to control the overall operation of computing device 200. The processor 202 may include any suitable processor, such as those described herein. Additionally, or alternatively, the computing device 200 may include any suitable number of processors in addition to or other than the processor 202. The computing device 200 may also include a user input device 204 that is configured to receive input from a user of the computing device 200 and to communicate signals representing the input received from the user to the processor 202. For example, the user input device 204 may include a button, keypad, dial, touch screen, audio input interface, visual/image capture input interface, input in the form of sensor data, etc.

The computing device 200 may include a display 206 that may be controlled by the processor 202 to display information to the user. A data bus 208 may be configured to facilitate data transfer between, at least, a storage device 210 and the processor 202. The computing device 200 may also include a network interface 212 configured to couple or connect the computing device 200 to various other computing devices or network devices via a network connection, such as a wired or wireless connection. In some embodiments, the network interface 212 includes a wireless transceiver.

The storage device 210 may comprise a single disk or a plurality of disks (e.g., hard drives), one or more solid-state drives, one or more hybrid hard drives, and the like. The storage device 210 may include a storage management module that manages one or more partitions within the storage device 210. In some embodiments, storage device 210 may include flash memory, semiconductor (solid state) memory or the like. The computing device 200 may also include a memory 214. The memory 214 may include Random Access Memory (RAM), a Read-Only Memory (ROM), or a combination thereof. The memory 214 may store programs, utilities, or processes to be executed in by the processor 202. The memory 214 may provide volatile data storage, and stores instructions related to the operation of the computing device 200.

In some embodiments, the computing device 200 may be configured to identify, for a first component of the vehicle 10, a first set of calibration values corresponding to the first component. For example, the computing device 200 may access a suitable database configured to store calibration values associated with the various components of the vehicle 10. The computing device 200 may retrieve a set of calibration values from the database corresponding to the first component. The set of calibration values may correspond to calibration values used on the first component in the commercial environment.

The computing device 200 may selectively adjust one or more calibration values of the set of calibration values. For example, the computing device 200 may set the one or more calibration values to be more sensitive than the corresponding calibration values of the set of calibration values. The computing device 200 may adjust the one or more calibration values based on an initial adjustment value (e.g., a predetermine value or adjustment amount configured to increase the sensitivity of the calibration values to issues, which may be referred to as a diagnostic sensitivity).

The initially adjusted set of calibration values (e.g., including the adjusted one or more calibration values) may be referred to as the first set of calibration values. The first component may include a component associated with the vehicle 10, such as a component associated with an electronic power steering system, or other suitable component. It should be understood that, while the component is described as a vehicle component, the systems and methods described herein may be configured to use any suitable component other than those described herein.

Figure 3:
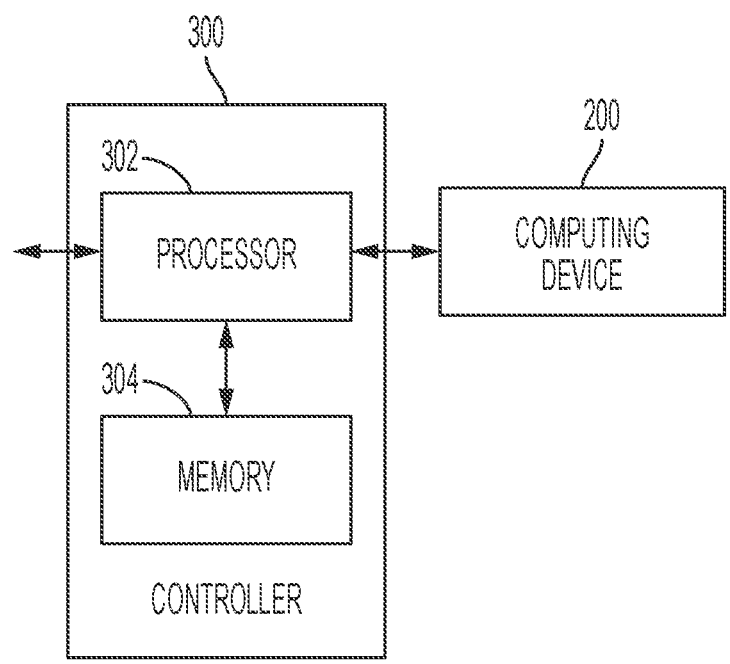

The computing device 200 may flash a controller associated with the first component with the first set of calibration values. The controller may include any suitable controller, such as the controller 300 as is generally illustrated in FIG. 3. The controller 300 may include any suitable controller. The controller 300 may be configured to control, for example, various aspects of the vehicle 10.

The controller 300 may include a processor 302 and a memory 304. The processor 302 may include any suitable processor, such as those described herein. Additionally, or alternatively, the controller 300 may include any suitable number of processors, in addition to or other than the processor 302. The memory 304 may comprise a single disk or a plurality of disks (e.g., hard drives), and includes a storage management module that manages one or more partitions within the memory 304. In some embodiments, memory 304 may include flash memory, semiconductor (solid state) memory or the like. The memory 304 may include Random Access Memory (RAM), a Read-Only Memory (ROM), or a combination thereof. The memory 304 may include instructions that, when executed by the processor 302, cause the processor 302 to, at least, control various functions of the vehicle 10 based on the compiled binary file, as described.

The computing device 200 may flash (e.g., program) the controller 300 using any suitable manner. The computing device 200 may perform at least one diagnostic test on the first component. The diagnostic test may include any suitable diagnostic test configured to identify issues or potential issues in the first component. In some embodiments, the computing device 200 performs the diagnostic test on the first component and monitors changes in various characteristics of the controller 300 and/or the first component. For example, the diagnostic test may include apply a voltage to a motor associated with the first component.

The computing device 200 may instruct the controller 300 to apply the voltage to the motor. The controller 300 may apply the voltage to the motor and the motor may corresponding operate. The computing device 200 may receive a diagnostic flag indication in response to a characteristic of the first component exceeding a limit (e.g., adjusted in the first set of calibration value to be more diagnostically sensitive) corresponding to the first set of calibration values. For example, in response to the controller 300 applying the voltage to the motor, a temperature of the motor may increase beyond an upper limit temperature set in the first set of calibration values. The controller 300 may stop the motor in response to the temperature exceeding the upper limit temperature (e.g., to avoid damage to the motor). The controller 300 may communicate a diagnostic flag signal indicating that the motor temperature exceeded the upper limit temperature.

The computing device 200, in response to receiving at least one diagnostic flag indicating at least one issue resulting from the diagnostic test, may determine whether the at least one diagnostic flag includes a false positive response. For example, the computing device 200 may compare the value associated with the diagnostic flag with an expected value. Additionally, or alternatively, a user of the computing device 200 may determine that the at least one diagnostic flag includes a false positive response.

The computing device 200, in response to a determination that the at least one diagnostic flag includes a false positive response, may selectively adjust at least one calibration value of the first set of calibration values. For example, the computing device 200 may determine that the at least one diagnostic flag includes a false positive response. The computing device 200 may decrease (e.g., decreasing the diagnostic sensitivity of the first set of calibration values) one or more calibration values of the first set of calibration values in order to reduce or eliminate the likelihood that the false positive response will be identified during a subsequent performance of the diagnostic test. If the computing device determines that the at least one diagnostic flag does not include a false positive response, the computing device 200 may generate a signal indicating that the first component includes at least one issue. The at least one issue of the first component may be remedied and/or the first component may be scrapped (e.g., discarded). It should be understood that the computing device 200 may analyze any suitable number of diagnostic flag and determine whether each of the issues includes a false positive response.

In some embodiments, the computing device 200, in response to selectively adjusting the at least one calibration value of the first set of calibration values, may perform a subsequent diagnostic test (e.g., a subsequent performance of the diagnostic test) on the first component using the adjusted first set of calibration values. For example, the computing device 200 may flash the controller 300 with the adjusted first set of calibration values. The computing device 200 may repeat performance of the diagnostic test on the controller 300 and/or the first component. The computing device 200 may analyze any issues resulting from the at least one diagnostic test on the first component using the adjusted first set of calibration values.

If the computing device 200 determines that at least one of the diagnostic flags resulting from the subsequent performance of the diagnostic test includes a false positive response, the computing device 200 may continue as described. Alternatively, if the computing device 200 determines that none of the diagnostic flags resulting from the subsequent performance of the diagnostic test includes a false positive response, the computing device 200 may generate the signal indicating that the first component includes at least one issue.

If the computing device 200 determines that the result of the performance of the diagnostic test (e.g., or any subsequent performance of the diagnostic test) includes no diagnostic flags, the computing device 200 may flash the controller 300 a first set of production calibration values. The first set of production calibration values may include the set of calibration values retrieved from the database corresponding to the first component (e.g., calibration values used in the commercial environment). The computing device 200 may generate a signal indicating that the first component has passed the diagnostic test.

Alternatively, if the computing device 200 determines that the result of the performance of the diagnostic test (e.g., or any subsequent performance of the diagnostic test) includes no diagnostic flags, the computing device 200 may selectively adjust the first set of calibration values by increasing at least one calibration value of the first set of calibration values (e.g., to further increase the diagnostic sensitivity of the first set of calibration values). The computing device 200 continue by subsequently performing the diagnostic test using the adjusted first set of calibration values, as described.

In some embodiments, the computing device 200 and/or the controller 300 may perform the methods described herein. However, the methods described herein as performed by the computing device 200 and/or the controller 300 are not meant to be limiting, and any type of software executed on a controller or processor can perform the methods described herein without departing from the scope of this disclosure. For example, a controller, such as a processor executing software within a computing device, can perform the methods described herein.

Figure 4:
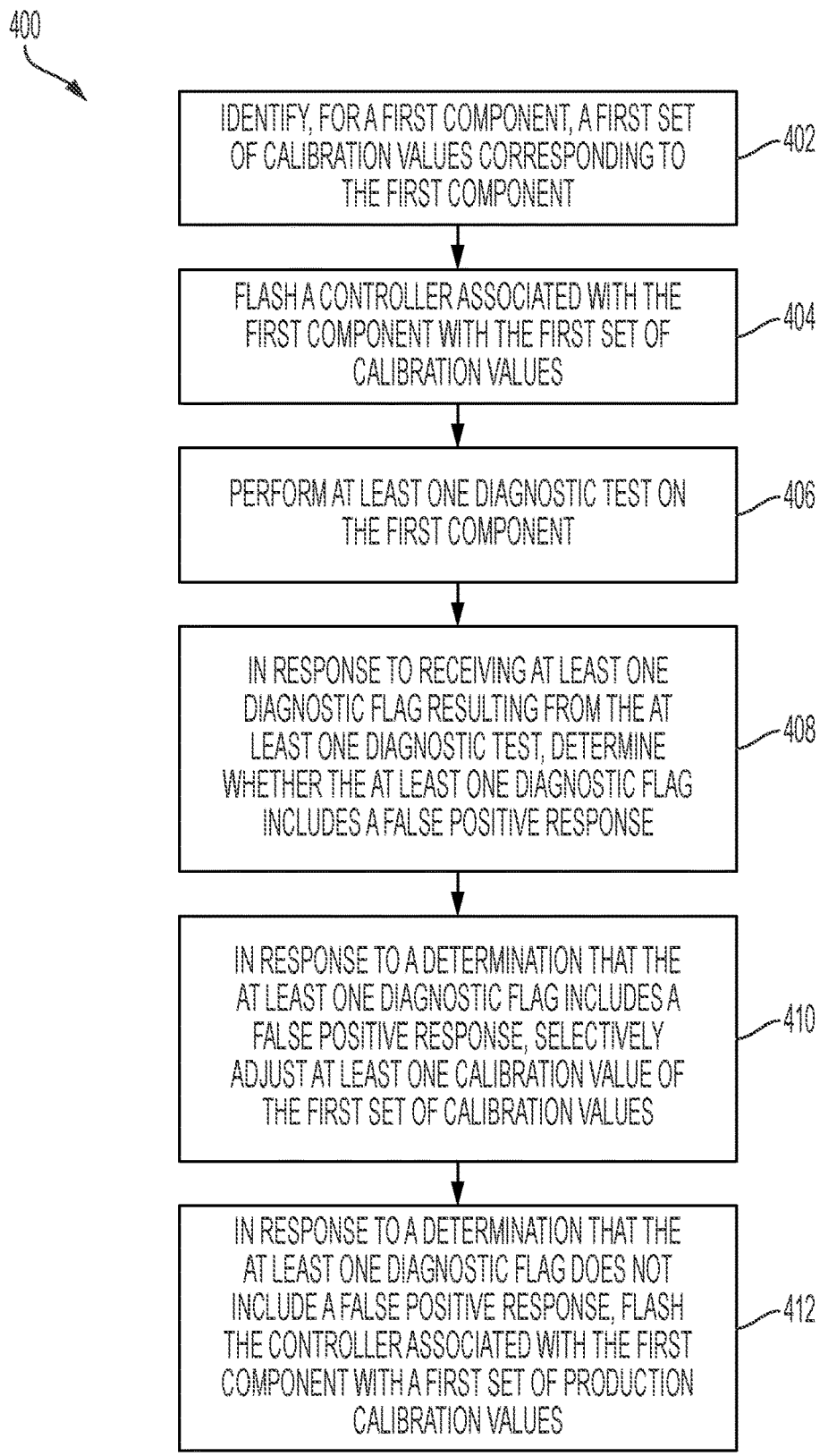

FIG. 4 is a flow diagram generally illustrating an issue identification method 400 according to the principles of the present disclosure. At 402, the method 400 identifies, for a first component, a first set of calibration values corresponding to the first component. For example, the computing device 200 may identify the first set of calibration values for the first component (e.g., by initially adjusting the set of calibration values retrieved from the database corresponding to the first component).

At 404, the method 400 flashes a controller associated with the first component with the first set of calibration values. For example, the computing device 200 may flash the controller 300 using the first set of calibration values.

At 406, the method 400 performs at least one diagnostic test on the first component. For example, the computing device 200 may perform the at least one diagnostic test on the first component using the controller 300.

At 408, the method 400, in response to receiving at least one diagnostic flag resulting from the at least one diagnostic test, determines whether the at least one issue includes a false positive response. For example, the computing device 200, in response to receiving the signal indicating the result of diagnostic test includes at least one diagnostic flag, determines whether the at least one issue includes a false positive response.

At 410, the method 400, in response to a determination that the at least one diagnostic flag includes a false positive response, selectively adjusts at least one calibration value of the first set of calibration values. For example, the computing device 200, in response to determining that the at least one diagnostic flag includes a false positive response, selectively adjusts at least one calibration value of the first set of calibration values. The computing device 200 may perform subsequent diagnostic tests on the first component.

At 412, the method 400, in response to a determination that the at least one diagnostic flag does not include a false positive response, flashes the controller associated with the first component with a first set of production calibration values. For example, the computing device 200, in response to determining that the at least one diagnostic flag does not include a false positive response, may flash the controller

300 with the first set of production calibration values (e.g., the set of calibration values used in the commercial environment). Additionally, or alternatively, if the computing device 200 determines that the result of the diagnostic test does not include any issues, the computing device 200 may adjust the diagnostic sensitivity of the first set of calibration values in increase the likelihood that the diagnostic test will capture potential issues in the first component. Additionally, or alternatively, if the computing device 200 determines that the result of the diagnostic test does not include any diagnostic flags, the computing device 200 may flash the controller 300 with the first set of production calibration values (e.g., the set of calibration values used in the commercial environment).

In some embodiments, a method for identifying potential component manufacturing issues includes identifying, for a first component, a first set of calibration values corresponding to the first component and flashing a controller associated with the first component with the first set of calibration values. The method also includes performing at least one diagnostic test on the first component and, in response to receiving at least one diagnostic flag resulting from the at least one diagnostic test, determining whether the at least one diagnostic flag includes a false positive response. The method also includes, in response to a determination that the at least one diagnostic flag includes a false positive response, selectively adjusting at least one calibration value of the first set of calibration values. The method also includes, in response to a determination that the at least one diagnostic flag does not include a false positive response, flashing the controller associated with the first component with a first set of production calibration values.

In some embodiments, the method also includes, in response to selectively adjusting the at least one calibration value of the first set of calibration values, performing the at least one diagnostic test on the first component using the adjusted first set of calibration values. In some embodiments, a diagnostic sensitivity of the first set of calibration values is greater than the first set of production calibration values. In some embodiments, selectively adjusting the at least one calibration value of the first set of calibration values, in response to the determination that the at least one diagnostic flag includes a false positive response, includes decreasing a diagnostic sensitivity of the at least one calibration value. In some embodiments, the method also includes, in response to a determination that the result of the at least one diagnostic test includes no diagnostic flags, selectively adjusting at least one calibration value of the first set of calibration values. In some embodiments, selectively adjusting the at last one calibration value of the first set of calibration values, in response to the determination that the result of the at least one diagnostic test includes no diagnostic flags, includes increasing a diagnostic sensitivity of the at least one calibration value. In some embodiments, the first component is associated with an electronic power steering system.

In some embodiments, a system for identifying potential component manufacturing issues includes a processor and a memory. The memory includes instructions that, when executed by the processor, cause the processor to: identify, for a first component, a first set of calibration values corresponding to the first component; flash a controller associated with the first component with the first set of calibration values; perform at least one diagnostic test on the first component; in response to receiving at least one diagnostic flag resulting from the at least one diagnostic test, determine whether the at least one diagnostic flag includes a false positive response; in response to a determination that the at least one diagnostic flag includes a false positive response, selectively adjust at least one calibration value of the first set of calibration values; and, in response to a determination that the at least one diagnostic flag does not include a false positive response, flash the controller associated with the first component with a first set of production calibration values.

In some embodiments, the instructions further cause the processor to, in response to selectively adjusting the at least one calibration value of the first set of calibration values, perform the at least one diagnostic test on the first component using the adjusted first set of calibration values. In some embodiments, a diagnostic sensitivity of the first set of calibration values is greater than the first set of production calibration values. In some embodiments, the instructions further cause the processor to selectively adjust, in response to the determination that the at least one diagnostic flag includes a false positive response, the at least one calibration value of the first set of calibration values by decreasing a diagnostic sensitivity of the at least one calibration value. In some embodiments, the instructions further cause the processor to, in response to a determination that the result of the at least one diagnostic test includes no diagnostic flag; selectively adjust at least one calibration value of the first set of calibration values. In some embodiments, instructions further cause the processor to selectively adjust the at last one calibration value of the first set of calibration values, in response to the determination that the result of the at least one diagnostic test includes no diagnostic flags, by increasing a diagnostic sensitivity of the at least one calibration value. In some embodiments, the first component is associated with an electronic power steering system.

In some embodiments, an apparatus for identifying potential component manufacturing issues includes a processor and a memory. The memory includes instructions that, when executed by the processor, cause the processor to: identify, for a first component, a first set of calibration values corresponding to the first component; flash a controller associated with the first component with the first set of calibration values; perform at least one diagnostic test on the first component; in response to receiving at least one diagnostic flag resulting from the at least one diagnostic test, determine whether the at least one diagnostic flag includes a false positive response; in response to a determination that the at least one diagnostic flag includes a false positive response, selectively decrease a diagnostic sensitivity of at least one calibration value of the first set of calibration values; in response to a determination that the at least one diagnostic flag does not include a false positive response, flash the controller associated with the first component with a first set of production calibration values; and, in response to a determination that the result of the at least one diagnostic test includes no diagnostic flags, selectively increase the diagnostic sensitivity of at least one calibration value of the first set of calibration values.

In some embodiments, the instructions further cause the processor to, in response to selectively adjusting the at least one calibration value of the first set of calibration values, perform the at least one diagnostic test on the first component using the adjusted first set of calibration values. In some embodiments, a diagnostic sensitivity of the first set of calibration values is greater than the first set of production calibration values. In some embodiments, the first component is associated with a vehicle. In some embodiments, the first component is associated with an electronic power steering system of a vehicle.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for identifying potential component manufacturing issues, the method comprising:
   identifying, for a first component, a first set of calibration values corresponding to the first component;
   flashing, during a manufacturing phase, a controller associated with the first component with the first set of calibration values;
   performing, during the manufacturing phase, at least one diagnostic test on the first component using an on-board diagnostic system of a controller associated with the first component, wherein the controller associated with the first component is disposed within a vehicle;
   in response to receiving at least one diagnostic flag resulting from the at least one diagnostic test, determining whether the at least one diagnostic flag includes a false positive response;
   in response to a determination that the at least one diagnostic flag includes a false positive response, selectively adjusting, during the manufacturing phase, at least one calibration value of the first set of calibration values;
   in response to selectively adjusting the at least one calibration value of the first set of calibration values, performing at least one subsequent diagnostic test on the first component using the adjusted first set of calibration values;
   in response to receiving at least one subsequent diagnostic flag resulting from the at least one subsequent diagnostic test, further adjusting, during the manufacturing phase and responsive to a determination that the at least one subsequent diagnostic flag includes a false positive response, the adjusted first set of calibration values; and
   in response to a determination that the at least one diagnostic flag does not include a false positive response, flashing the controller associated with the first component with a first set of production calibration values, wherein a diagnostic sensitivity of the first set of calibration values is greater than the first set of production calibration values, wherein the first set of production calibration values are used during a production use of the first component, and wherein the production use of the first component occurs after the first component exits the manufacturing phase.

2. The method of claim 1, wherein selectively adjusting the at least one calibration value of the first set of calibration values, in response to the determination that the at least one diagnostic flag includes a false positive response, includes decreasing the diagnostic sensitivity of the at least one calibration value.

3. The method of claim 1, further comprising, in response to a determination that the result of the at least one diagnostic test includes no diagnostic flags, selectively adjusting at least one calibration value of the first set of calibration values.

4. The method of claim 3, wherein selectively adjusting the at last one calibration value of the first set of calibration values, in response to the determination that the result of the at least one diagnostic test includes no diagnostic flags, includes increasing the diagnostic sensitivity of the at least one calibration value.

5. The method of claim 1, wherein the first component is associated with an electronic power steering system.

6. A system for identifying potential component manufacturing issues, the system comprising:
 a processor; and
 a memory including instructions that, when executed by the processor, cause the processor to:
  identify, for a first component, a first set of calibration values corresponding to the first component;
  flash, during a manufacturing phase, a controller associated with the first component with the first set of calibration values;
  perform, during the manufacturing phase, at least one diagnostic test on the first component using an on-board diagnostic system of a controller associated with the first component, wherein the controller associated with the first component is disposed within a vehicle;
  in response to receiving at least one diagnostic flag resulting from the at least one diagnostic test, determine whether the at least one diagnostic flag includes a false positive response;
  in response to a determination that the at least one diagnostic flag includes a false positive response, selectively adjust, during the manufacturing phase, at least one calibration value of the first set of calibration values;
  in response to selectively adjusting the at least one calibration value of the first set of calibration values, perform at least one subsequent diagnostic test on the first component using the adjusted first set of calibration values;
  in response to receiving at least one subsequent diagnostic flag resulting from the at least one subsequent diagnostic test, further adjust, during the manufacturing phase and responsive to a determination that the at least one subsequent diagnostic flag includes a false positive response, the adjusted first set of calibration values; and
  in response to a determination that the at least one diagnostic flag does not include a false positive response, flash the controller associated with the first component with a first set of production calibration values, wherein a diagnostic sensitivity of the first set of calibration values is greater than the first set of production calibration values, wherein the first set of production calibration values are used during a production use of the first component, and wherein the production use of the first component occurs after the first component exits the manufacturing phase.

7. The system of claim 6, wherein the instructions further cause the processor to selectively adjust, in response to the determination that the at least one diagnostic flag includes a false positive response, the at least one calibration value of the first set of calibration values by decreasing the diagnostic sensitivity of the at least one calibration value.

8. The system of claim 6, wherein the instructions further cause the processor to, in response to a determination that the result of the at least one diagnostic test includes no diagnostic flags, selectively adjust at least one calibration value of the first set of calibration values.

9. The system of claim 6, wherein the instructions further cause the processor to selectively adjust the at last one calibration value of the first set of calibration values, in response to the determination that the result of the at least one diagnostic test includes no diagnostic flags, by increasing the diagnostic sensitivity of the at least one calibration value.

10. The system of claim 6, wherein the first component is associated with an electronic power steering system.

11. An apparatus for identifying potential component manufacturing issues, the apparatus comprising:
 a processor; and
 a memory including instructions that, when executed by the processor, cause the processor to:
  identify, for a first component, a first set of calibration values corresponding to the first component;
  flash, during a manufacturing phase, a controller associated with the first component with the first set of calibration values;
  perform, during the manufacturing phase, at least one diagnostic test on the first component using an on-board diagnostic system of a controller associated with the first component, wherein the controller associated with the first component is disposed within a vehicle;
  in response to receiving at least one diagnostic flag resulting from the at least one diagnostic test, determine whether the at least one diagnostic flag includes a false positive response;
  in response to a determination that the at least one diagnostic flag includes a false positive response, selectively decrease, during the manufacturing phase, a diagnostic sensitivity of at least one calibration value of the first set of calibration values;
  in response to selectively decreasing the at least one calibration value of the first set of calibration values, performing at least one subsequent diagnostic test on the first component using the decreased first set of calibration values;
  in response to receiving at least one subsequent diagnostic flag resulting from the at least one subsequent diagnostic test, further decreasing, during the manufacturing phase and responsive to a determination that the at least one subsequent diagnostic flag includes a false positive response, the decreased first set of calibration values;
  in response to a determination that the at least one diagnostic flag does not include a false positive response, flash the controller associated with the first component with a first set of production calibration values, wherein a diagnostic sensitivity of the first set of calibration values is greater than the first set of production calibration values, wherein the first set of production calibration values are used during a production use of the first component, and wherein the production use of the first component occurs after the first component exits the manufacturing phase; and
  in response to a determination that the result of the at least one diagnostic test includes no diagnostic flags, selectively increase the diagnostic sensitivity of at least one calibration value of the first set of calibration values and generate the first set of production calibration values based on the first set of calibration values.

12. The apparatus of claim 11, wherein the first component is associated with the vehicle.

13. The apparatus of claim 11, wherein the first component is associated with an electronic power steering system of the vehicle.

* * * * *